Aug. 13, 1957  H. R. STOCKS  2,802,692
VEHICLE VENTILATOR
Filed Sept. 27, 1955  2 Sheets-Sheet 1

Inventor
Harry Ronald Stocks
By H. E. Jones
Attorney

Aug. 13, 1957   H. R. STOCKS   2,802,692
VEHICLE VENTILATOR
Filed Sept. 27, 1955   2 Sheets-Sheet 2
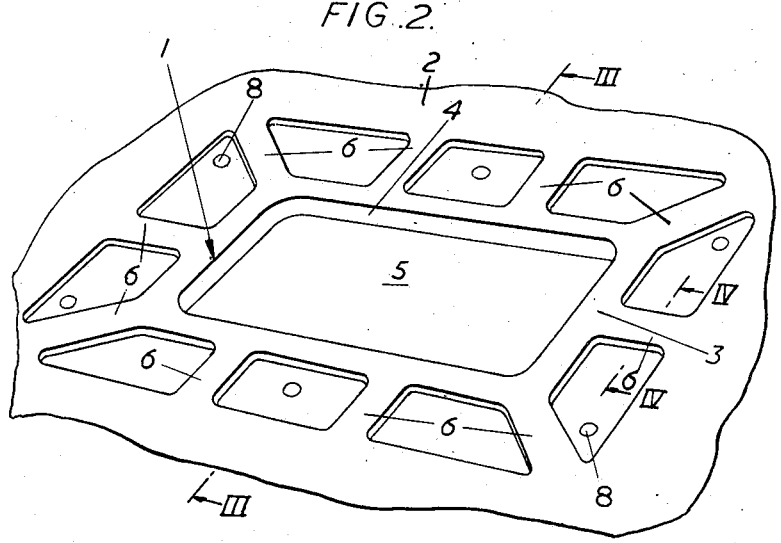
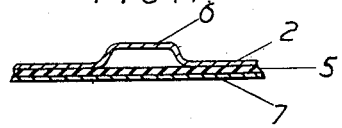
Inventor
Harry Ronald Stocks
By H. E. Jones
Attorney

United States Patent Office 2,802,692
Patented Aug. 13, 1957

2,802,692

VEHICLE VENTILATOR

Harry R. Stocks, Dunstable, England, assignor to General Motors Corporation, Detroit, Mich., a corporation of Delaware Application September 27, 1955, Serial No. 536,839

Claims priority, application Great Britain October 5, 1954

6 Claims. (Cl. 296—28)

This invention relates to the ventilation of automobile bodies.

The problem with which the invention is primarily concerned is that of removing stale air from an automobile body, especially when its interior is being supplied with heated air, and the windows are closed. In such a case there should be some facility, such as natural leakage at doors and windows, for allowing the escape of the stale air without permitting undue loss of fresh heated air and without allowing entry of dust or engine fumes; in modern vehicles however, the efficient sealing of doors and windows may leave insufficient natural leakage for this purpose.

The present invention is based upon the use of an air outlet valve which is automatically openable solely by the effect of air pressure within the vehicle body, so that the valve is opened only when the interior air pressure is sufficiently above the external atmospheric pressure. In this way the entry of fumes or dust when the valve is open is prevented by the slight higher internal air-pressure. When the internal air pressure falls below a critical level, for example when the car stops and doors are opened, the valve automatically closes. The slightly super-atmospheric pressure within the vehicle may be maintained for example by the ram effect of air in a forwardly-facing air intake to a heater when the closed vehicle is in motion.

Since the function of the valve is to emit stale cooler air, its preferable location is in the lower part of the vehicle body rather than in the upper part, to which latter fresh heated air tends to rise. Thus, the valve may be in the floor, for example below a rear seat, where it is protected.

The scope of the invention is defined by the appended claims. How the invention may be carried into effect will now be particularly described with reference to the accompanying drawings, in which:

Fig. 2 is an enlargement of the part of Fig. 1 enclosed within the circle II;

Fig. 4 is a section on line IV—IV in Fig. 2.

Figure 1:
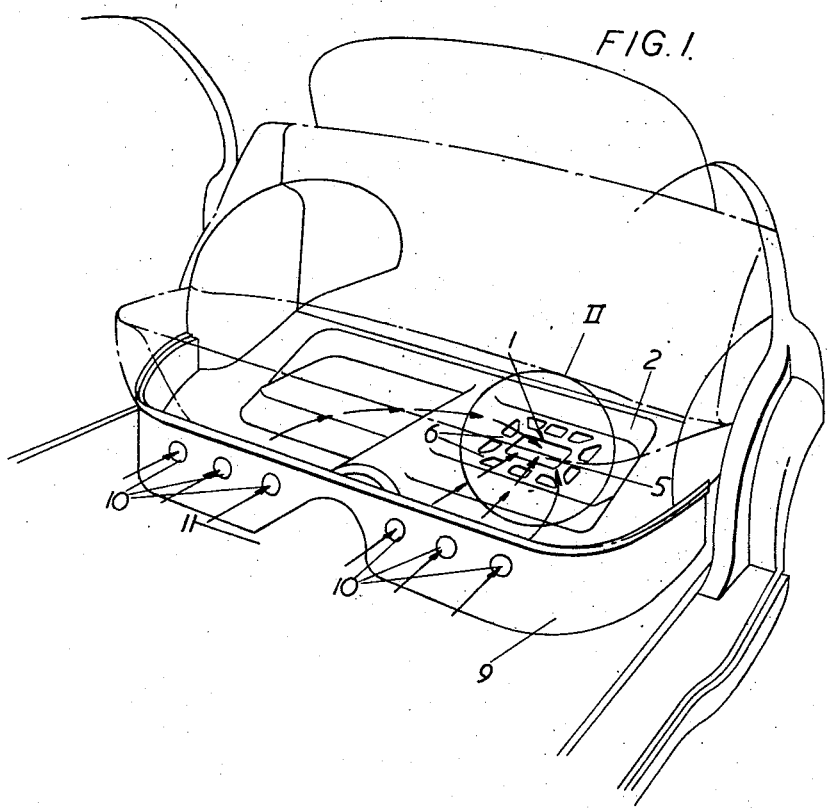
Fig. 1 is a fragmentary perspective view of the interior of a motor vehicle body, showing an air outlet valve under the rear seat.
Figure 3:
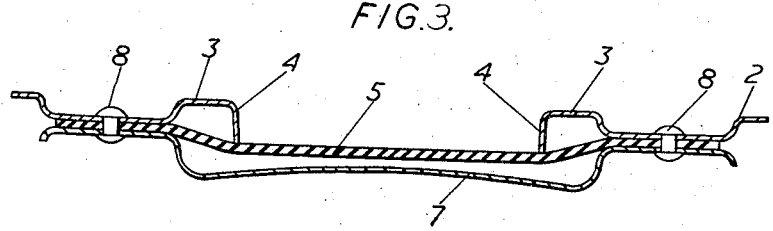
Fig. 3 is a section on line III—III in Fig. 2.

Referring to the drawings, the vehicle shown has an air outlet valve in the floor under the rear seat. The valve comprises a rectangular aperture formed in a metal floor skin panel 2 which has stamped into the metal around the aperture a symmetrical embossed pattern of channels, the relief side of the pattern facing the inside of the car, while the recessed side of the pattern faces outwardly. The embossed pattern comprises a "header" channel 3 of rectangular course which follows the margin of the rectangular valve-aperture 1 and by its inner side forms a rectangular seating lip 4 across which a valve diaphragm 5, made of a sheet of rubber, is lightly stretched and secured around its entire margin to the metal floor panel 2. The remainder of the embossed pattern consists of short radiating channels 6 opening at their radially inner ends into the rectangular "header" channel 3 and at their outer ends communicating with the outside air. These short channels 6 permit air to escape outwardly when the air pressure inside the body, urges the diaphragm 5 outward sufficiently to press it from the seating lip 4, the air can then pass round the lip 4 into the rectangular channel 3 and the radiating escape channels 6 by a path involving a change of direction around the lip 4. The arrow in Figs. 1–3 illustrate the outward airflow when the valve is open.

The dimensions of the diaphragm surface exposed to internal air pressure, and the degree of tensioning of the diaphragm 5, must be such as to ensure satisfactory automatic opening of the valve to secure the desired ventilation of stale air.

A metal guard plate 7 is attached outside the diaphragm 5 to protect it from damage. Rivets 8 serve to fasten both diaphragm 5 and guard plate 7 to the floor panel 2, and the margin of the diaphragm is firmly secured between the floor panel 2 and the margin of the guard plate 7.

The vertical heel board 9 of the rear seat has apertures 10 to allow access of air to the valve while covering it from view and damage. As shown there is one valve located towards one side of the car. Alternatively there may be two such valves, one on each side of a propeller shaft tunnel 11.

I claim:

1. An automobile body comprising a rear seat heel plate having at least one air aperture, a floor panel having a rectangular valve aperture behind said heel plate, an outwardly-turned lip forming the margin of said aperture, air outlet channels surrounding said lip, and a resilient valve diaphragm stretched across said lip and pressed therefrom by internal air pressure to vent the body interior through said channels.

2. In an automobile body, a floor panel having a rectangular air outlet, an outwardly-turned lip forming the margin of said aperture, an air channel of rectangular course surrounding said lip and bounded on one side thereby, air outlet channels radiating outwardly from said rectangular channel, and a resilient valve diaphragm stretched across said lip and pressable therefrom by internal air pressure to vent the body interior through said channels.

3. The combination according to claim 2, having a metal guard plate secured externally of said diaphragm.

4. In an automobile body, a metal floor panel having a rectangular aperture; a symmetrical pattern of channels embossed in the external surface of the panel about said aperture, said pattern comprising a header channel of rectangular course bordering the aperture and radiating channels joining on to said header channel; an outwardly-turned lip forming the joint margin of said aperture and said header channel; and a resilient diaphragm stretched across said lip and pressable therefrom by air pressure within the body to vent the interior thereof through said channels.

5. An air vent valve for an automobile body comprising a metal panel having a rectangular aperture therein; a lip forming the margin of said aperture; a symmetrical channel system embossed into the panel about said aperture, said system comprising a header channel of rectangular course surrounding said lip bounded on one side thereby, and vent channels radiating from the header channel; and a resilient diaphragm stretched across said lip and pressable therefrom by air pressure to vent said aperture through the channel system.

6. A valve according to claim 5, having a metal guard protecting one side of said diaphragm.

(References on following page)

References Cited in the file of this patent

UNITED STATES PATENTS

| | | |
|---|---|---|
| 227,977 | Horton | May 25, 1880 |
| 1,439,681 | Alkire et al. | Dec. 26, 1922 |
| 1,621,498 | Drager | Mar. 22, 1927 |
| 2,126,607 | Boehner | Aug. 9, 1938 |
| 2,234,781 | Schjolin | Mar. 11, 1941 |
| 2,399,326 | Crot | Apr. 30, 1946 |
| 2,463,487 | Widgery et al. | Mar. 1, 1949 |
| 2,485,113 | Roth et al. | Oct. 18, 1949 |
| 2,523,923 | Rodert | Sept. 26, 1950 |
| 2,641,501 | Ensey | June 9, 1953 |